United States Patent
Sawa et al.

(10) Patent No.: US 8,228,164 B2
(45) Date of Patent: Jul. 24, 2012

(54) REMOTE CONTROL SYSTEM FOR CAR-MOUNTED DEVICE

(75) Inventors: Yoshitsugu Sawa, Tokyo (JP); Hiroshi Araki, Tokyo (JP); Yukio Goto, Tokyo (JP); Masashi Nojima, Tokyo (JP); Masanobu Hiramine, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 413 days.

(21) Appl. No.: 12/526,693

(22) PCT Filed: Jan. 21, 2008

(86) PCT No.: PCT/JP2008/050706
§ 371 (c)(1),
(2), (4) Date: Aug. 11, 2009

(87) PCT Pub. No.: WO2008/102588
PCT Pub. Date: Aug. 28, 2008

(65) Prior Publication Data
US 2010/0141382 A1    Jun. 10, 2010

(30) Foreign Application Priority Data
Feb. 19, 2007  (JP) .................. 2007-037380

(51) Int. Cl.
G05B 19/00 (2006.01)
B60R 25/04 (2006.01)
H04B 1/00 (2006.01)
(52) U.S. Cl. ............... 340/5.64; 340/5.26; 307/10.5; 375/141
(58) Field of Classification Search .............. None
See application file for complete search history.

(56) References Cited

U.S. PATENT DOCUMENTS
4,928,098 A * 5/1990 Dannhaeuser ............ 340/5.26
(Continued)

FOREIGN PATENT DOCUMENTS
JP        5 106376        4/1993
(Continued)

OTHER PUBLICATIONS
Office Action issued Nov. 8, 2011 in Japanese Application Serial No. 2009-500108 (w/ partial English translation).

*Primary Examiner* — George Bugg
*Assistant Examiner* — Renee Dorsey
(74) *Attorney, Agent, or Firm* — Oblon, Spivak, McClelland, Maier & Neustadt, L.L.P.

(57) ABSTRACT

A remote control system for a car-mounted device capable of realizing communication performance required for a keyless function and communication performance required for a smart function while suppressing increase in circuit scale. The remote control system includes a portable unit and an in-car unit. The portable unit includes: a function judgment mechanism judging whether the keyless function or the smart function is used; an amplification mechanism controlling transmission power in response to a result of judgment obtained at the function judgment mechanism; and a system clock generator controlling a transmission band in response to a result of judgment obtained at the function judgment part. The in-car unit includes: an in-car function judgment mechanism judging whether the keyless function or the smart function is used; and in-car system clock generator controlling a receiving band in response to a result of judgment obtained at the in-car function judgment mechanism.

10 Claims, 16 Drawing Sheets

U.S. PATENT DOCUMENTS

| | | | |
|---|---|---|---|
| 5,886,421 A * | 3/1999 | Mizuno et al. | 307/10.5 |
| 6,956,460 B2 * | 10/2005 | Tsui | 340/5.26 |
| 2002/0070845 A1 | 6/2002 | Reisinger et al. | |
| 2003/0112851 A1 * | 6/2003 | Aust et al. | 375/141 |

FOREIGN PATENT DOCUMENTS

| | | |
|---|---|---|
| JP | 6 252881 | 9/1994 |
| JP | 7 95654 | 4/1995 |
| JP | 11343762 | 12/1999 |
| JP | 2001-098810 | 4/2001 |
| JP | 2002 4675 | 1/2002 |
| JP | 2002 16526 | 1/2002 |
| JP | 2003 500957 | 1/2003 |
| JP | 2005-256472 | 9/2005 |
| JP | 2006-219925 | 8/2006 |

* cited by examiner

F I G . 6
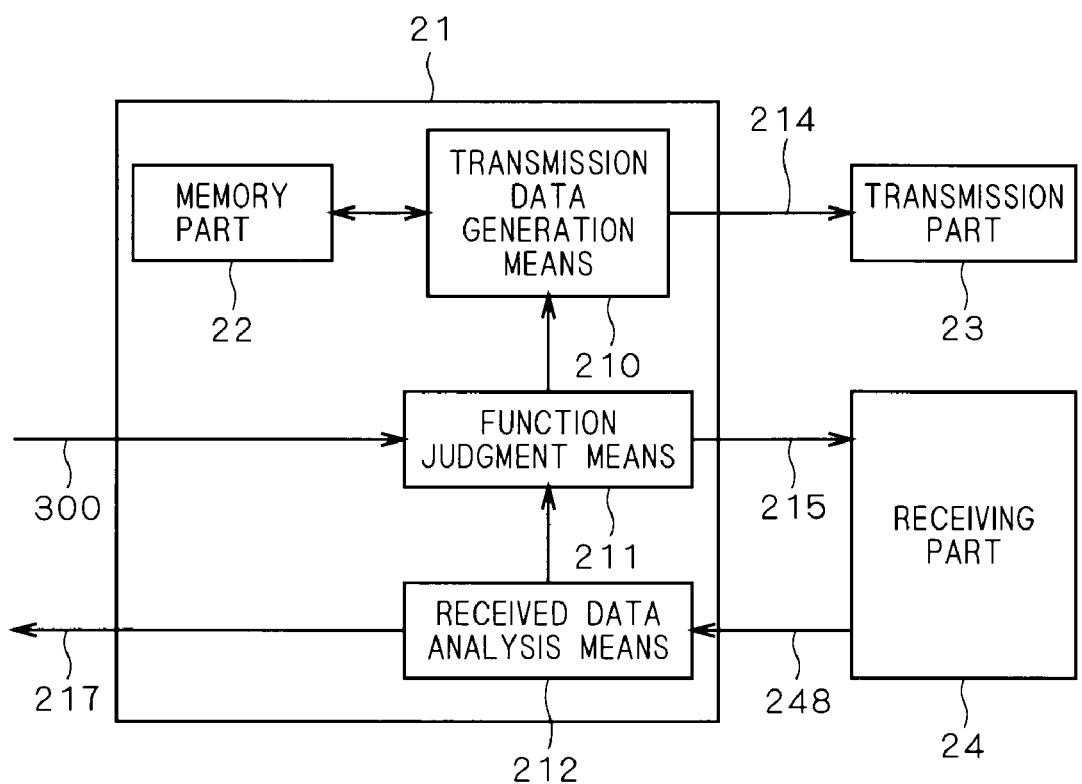

REMOTE CONTROL SYSTEM FOR CAR-MOUNTED DEVICE

TECHNICAL FIELD

The present invention relates to a remote control system for a car-mounted device, and more specifically, to a remote control system for a car-mounted device for performing remote control by communication between a portable unit and an in-car unit.

BACKGROUND ART

A remote control system for a car-mounted device conventionally has a remote operation function (keyless function) for locking/unlocking a door of a car by operating an operation part of a portable unit, and a smart function for locking/unlocking a door of a car and the like without operating the operation part. Without operating the operation part of the portable unit, the smart function realizes locking/unlocking of a door and the like by verifying a response signal sent back from the portable unit in response to an inquiry signal transmitted from the car.

A remote control system for a car-mounted device with the smart function in addition to the keyless function is disclosed for example in patent publication 1. Patent document 1 discloses a remote control system for a car-mounted device including a portable wireless unit with transmission means for transmitting a response signal when an inquiry signal is received, and control means for outputting a signal for unlocking a door of a car when receiving means receives a response signal transmitted after an inquiry signal transmitted at certain intervals is received, and for outputting a signal for locking a door of the car after the elapse of a predetermined period of time when a response signal is not received.

When a remote control system for a car-mounted device handles a plurality of portable units, response times of the portable units for responding to an inquiry signal from a car should be shortened. A remote control system for a car-mounted device disclosed in patent document 2 employs a spread spectrum communication system allowing multiple access in which communication time is constant irrespective of the number of portable units.

Patent Document 1: Japanese Patent Application Laid-Open No. 5-106376

Patent Document 2: Japanese Patent Publication No. 2003-500957

In the keyless function for locking/unlocking a door of a car by operating an operation part of a portable unit, transmission power should be increased for communication from a distance, and a transmission waveform with a limited transmission band should be used. When the transmission band of a transmission waveform is limited, however, high spreading gain is difficult to achieve in spread spectrum, causing a problem of degradation of signal separation performance in the smart function for responding to an inquiry signal from the car. The increase in transmission power also causes interference with another car. This necessitates the use of a different code for each car, so many codes should be used. A code sequence with a large number of codes results in degradation of separation performance. A code sequence with a large number of codes also causes degradation of signal separation performance in the smart function.

DISCLOSURE OF INVENTION

In order to solve the problems discussed above, the present invention is intended to provide a remote control system for a car-mounted device capable of realizing communication performance required for a keyless function and communication performance required for a smart function while suppressing the increase in circuit scale.

The present invention is intended for a remote control system for a car-mounted device including a portable unit, and an in-car unit for controlling a certain operation in a car by communication with the portable unit. The portable unit includes: function judgment means for judging whether a keyless function or a smart function is used based on an inquiry signal from an operation detection part or the in-car unit; amplification means for controlling transmission power of a transmission part in response to a result of judgment obtained at the function judgment means; and system clock generation means for controlling a transmission band of the transmission part in response to a result of judgment obtained at the function judgment part. The in-car unit includes: in-car function judgment means for judging whether the keyless function or the smart function is used based on a response signal from the portable unit; and in-car system clock generation means for controlling a receiving band of an in-car receiving part in response to a result of judgment obtained at the in-car function judgment means.

In the remote control system for a car-mounted device recited in the present invention, the portable unit includes: the function judgment means for judging whether the keyless function or the smart function is used: the amplification means for controlling transmission power; and the system clock generation means for controlling a transmission band. The in-car unit includes: the in-car function judgment means for judging whether the keyless function or the smart function is used; and the in-car system clock generation means for controlling a receiving band. Thus, it is possible to realize communication performance required for the keyless function and communication performance required for the smart function, while the increase in circuit scale is suppressed.

These and other objects, features, aspects and advantages will become more apparent from the following detailed description of the present invention when taken in conjunction with the accompanying drawings.

BRIEF DESCRIPTION OF DRAWINGS

FIG. 6 is a block diagram of an ECU part according to the first embodiment of the present invention;

BEST MODE FOR CARRYING OUT THE INVENTION (First Embodiment)

Figure 1:
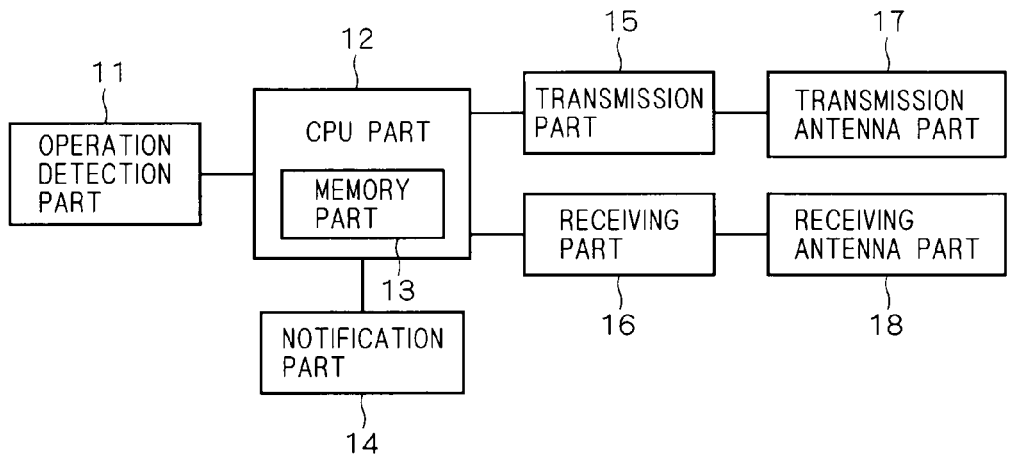
FIG. 1 is a block diagram of a portable unit according to a first embodiment of the present invention.

FIG. 1 is a block diagram of a portable unit of a remote control system for a car-mounted device according to the present embodiment. A portable unit 10 shown in FIG. 1 includes an operation detection part 11 for detecting an operation by a user, and a CPU part 12 for processing a result of detection obtained at the operation detection part 11. A memory part 13 is built into the CPU part 12 shown in FIG. 1. The memory part 13 is a non-volatile memory such as an EEPROM, and stores therein ID codes, encryption keys and the like. Contents stored in the memory part 13 are retained after power shutdown. A notification part 14 for notifying a user of the state of operation, etc. is connected to the CPU 12 shown in FIG. 1.

The portable unit 10 shown in FIG. 1 also includes a transmission antenna part 17 and a receiving antenna part 18. The transmission antenna part 17 is connected to a transmission part 15, the receiving antenna part 18 is connected to a receiving part 16, and the transmission part 15 and the receiving part 16 are connected to the CPU part 12. An inquiry signal from an in-car unit received at the receiving antenna part 18 (a signal with a frequency of 125 kHz, for example) is demodulated at the receiving part 16, and is supplied to the CPU part 12.

Figure 2:
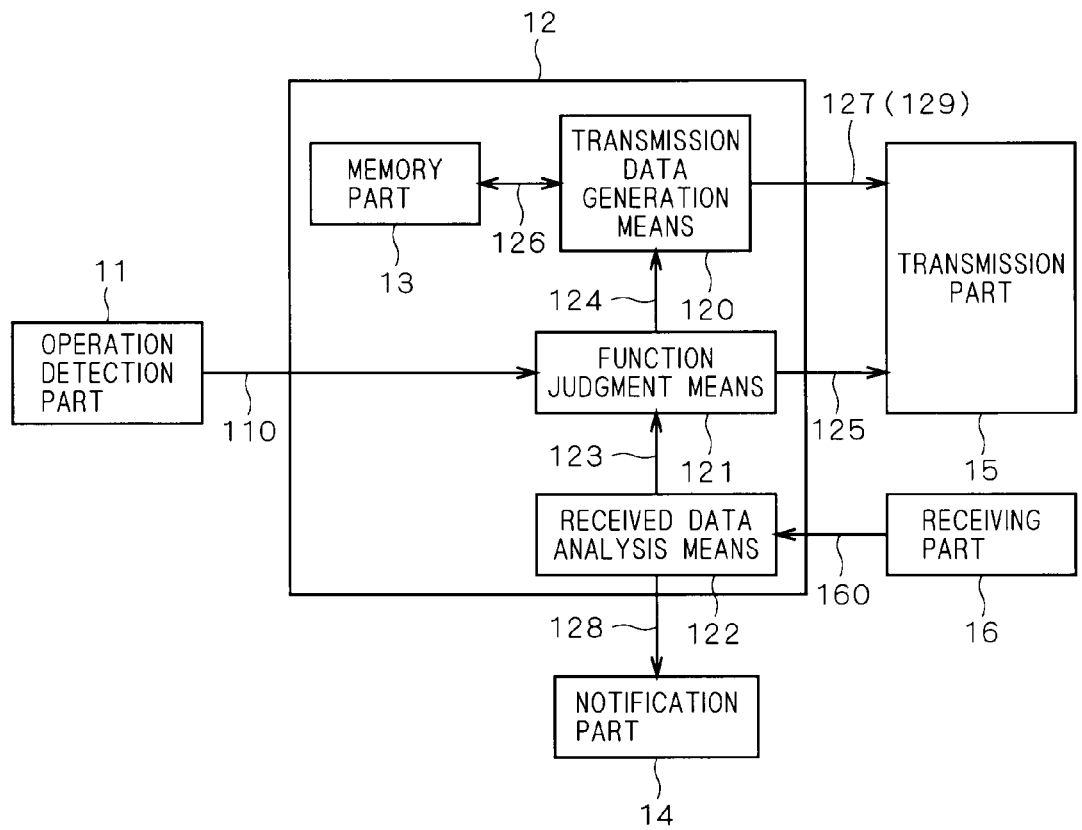
FIG. 2 is a block diagram of a CPU part according to the first embodiment of the present invention.

FIG. 2 is a block diagram of the CPU part 12 according to the present embodiment. In the CPU part 12 shown in FIG. 2, an inquiry signal 160 received at the receiving part 16 is analyzed at received data analysis means 122, and encryption key information 123 corresponding to a proper inquiry signal is retrieved and notified to function judgment means 121. The received data analysis means 122 analyzes the power of the inquiry signal 160, and notifies the transmission part 15 of a transmission band of a response signal responsive to this power. This enhances the signal separation performance of the response signal. The received data analysis means 122 notifies the notification part 14 of received information 128, and the notification part 14 performs certain display based on the received information 128.

Next, the function judgment means 121 judges whether a remote operation function (hereinafter also referred to as a keyless function) or a smart function is used based on a detection signal 110 from the operation detection part 11 or the encryption key information 123. More specifically, the function judgment means 121 judges that the keyless function is used when the detection signal 110 is received, and judges that the smart function is used when the encryption key information 123 is received. The function judgment means 121 transmits a result of judgment as a function selection signal 125 to the transmission part 15. When the smart function is judged to be used, the function judgment means 121 notifies corresponding encryption key information 124 to transmission data generation means 120. The transmission data generation means 120 reads an encryption key 126 from the memory part 13 based on the encryption key information 124, and encrypts an inquiry code in the inquiry signal 160 using the encryption key 126 to generate a response signal 127. The response signal 127 thereby generated is supplied to the transmission part 15.

Figure 3:
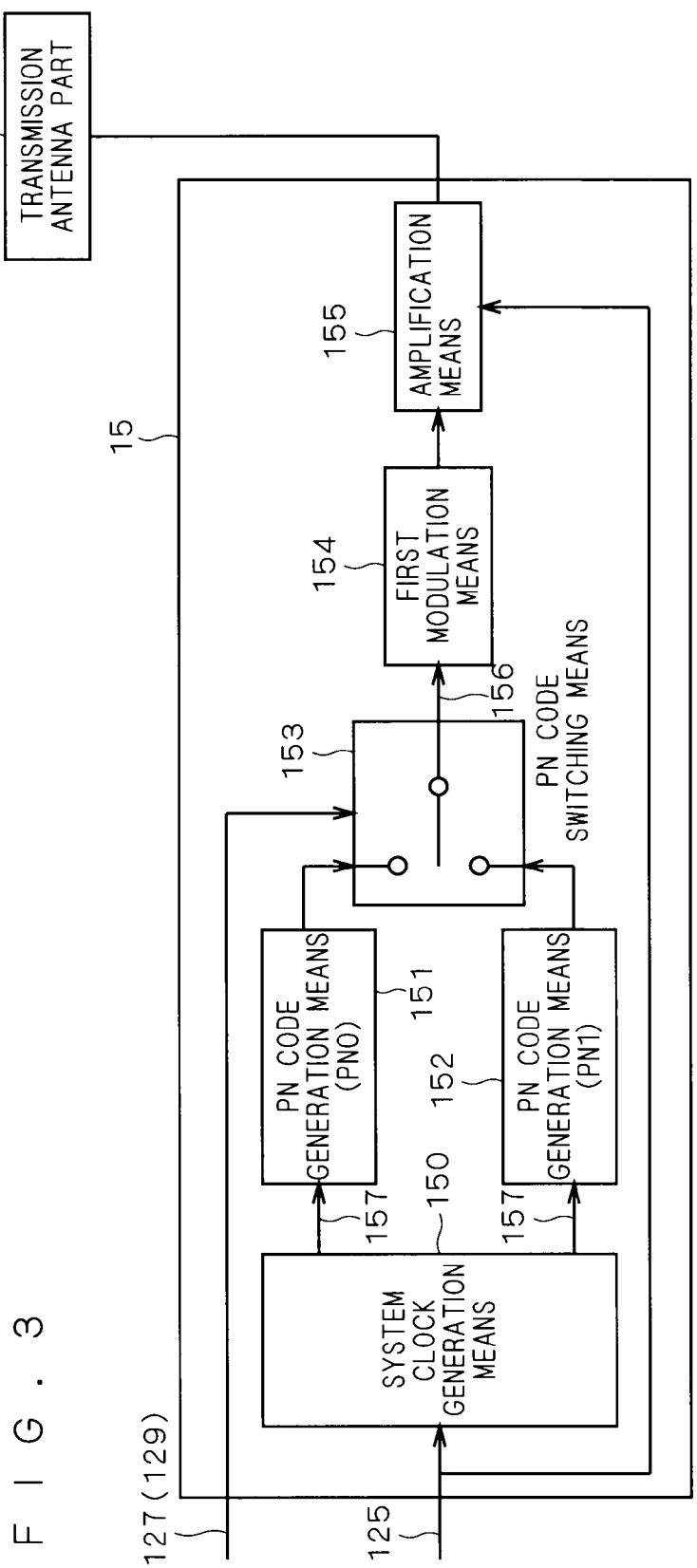
FIG. 3 is a block diagram of a transmission part according to the first embodiment of the present invention.

FIG. 3 is a block diagram of the transmission part 15 according to the present embodiment. In the transmission part 15 shown in FIG. 3, system clock generation means 150 having received the function selection signal 125 generates a system clock 157 intended for the smart function as selected, and supplies the same to PN code generation means 151 and 152. The PN code generation means 151 and 152 generate PN codes based on the system clock 157, and transmit the same to PN code switching means 153. The PN code generation means 151 generates a PN code PN0 corresponding to data 0, and the PN code generation means 152 generates a PN code PN1 corresponding to data 1.

The PN code switching means 153 switches between the PN code generation means 151 and 152 in response to the response signal 227 sent from the CPU part 12, and codes the response signal 127 in PN codes. First modulation means 154 modulates a signal 156 coded at the PN code switching means 153 in a certain system, and transmits a modulated signal to amplification means 155. The amplification means 155 amplifies the received modulated signal to a level not higher than certain transmission power (corresponding for example to that of an extremely low power radio station) suitable for the smart function selected at the function selection signal 125, and the received modulated signal is transmitted at a certain frequency (such as 315 MHz, for example) from the transmission antenna part 17 to an in-car unit 20.

When the keyless function is used, a button such as a lock key/unlock key is provided to the operation detection part 11 of the portable unit 10 for locking/unlocking a door. When an operator operates this button, the detection signal 110 is output from the operation detection part 11 to the CPU part 12.

In the CPU part 12, the function judgment means 121 receives the detection signal 110 from the operation detection part 11, and transmits the function selection signal 125 to the transmission part 15 as shown in FIG. 2. Further, the function judgment means 121 instructs the transmission data generation means 120 to transmit a rolling code. A rolling code has a value counted up each time a portable unit transmits a radio wave. An in-car unit stores therein a rolling code received last time, and verification is allowed when a rolling code received this time falls within a certain range. The transmission data generation means 120 reads a rolling code 129 from the memory part 13 based on instructions from the function judgment means 121, and transmits the same to the transmission part 15.

In the transmission part 15, the system clock generation means 150 generates a system clock 157 intended for the keyless function based on the function selection signal 125 as shown in FIG. 3. Based on this system clock, the PN code generation means 151 and 152 generate respective PN codes, and the PN code switching means 153 selects one of these PN codes. The rolling code 129 that has been coded based on the selected PN code (coded signal 156) enters the first modulation means 154, is amplified to a level not lower than certain transmission power (corresponding for example to that of a specified low power radio station) suitable for the keyless function at the amplification means 155, and is transmitted at a certain frequency (such as 315 MHz, for example).

Figure 4:
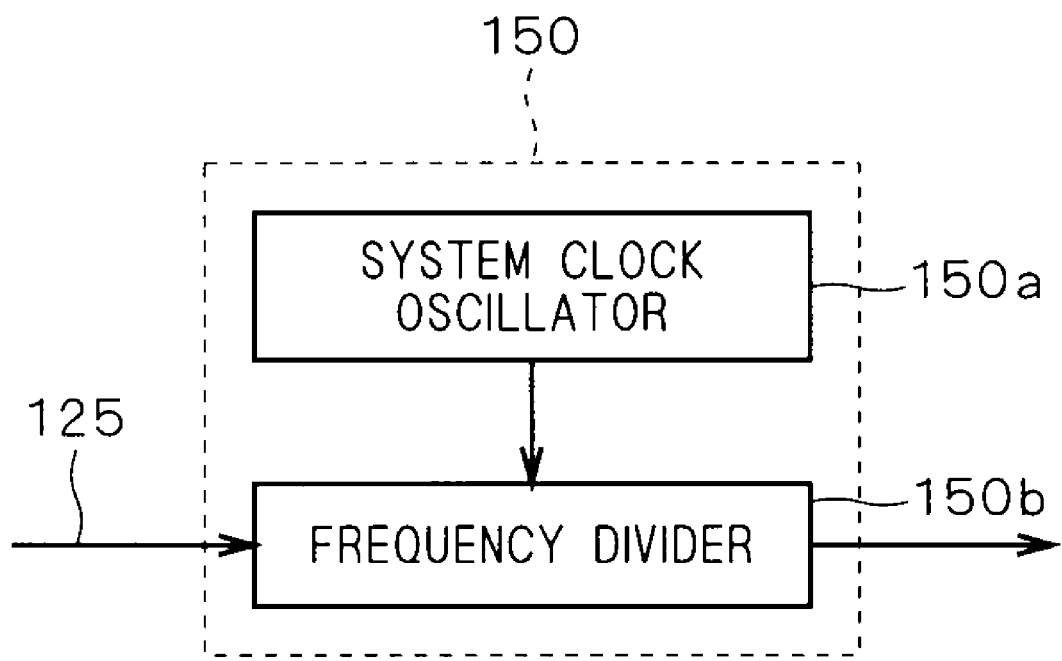
FIG. 4 is a block diagram of system clock generation means according to the first embodiment of the present invention.

Here, means for changing a system clock in the system clock generation means 150 is discussed. The system clock generation means 150 shown in FIG. 4 includes a system clock oscillator 150*a* for causing a system clock with a fixed frequency to oscillate, and a frequency divider 150*b* for dividing the frequency of the system clock to change its frequency. The system clock generation means 150 shown in FIG. 4 changes the dividing ratio of the frequency divider 150*b* based on the function selection signal 125 to generate the system clock 157 intended for the smart function and the system clock 157 intended for the keyless function.

Figure 5:
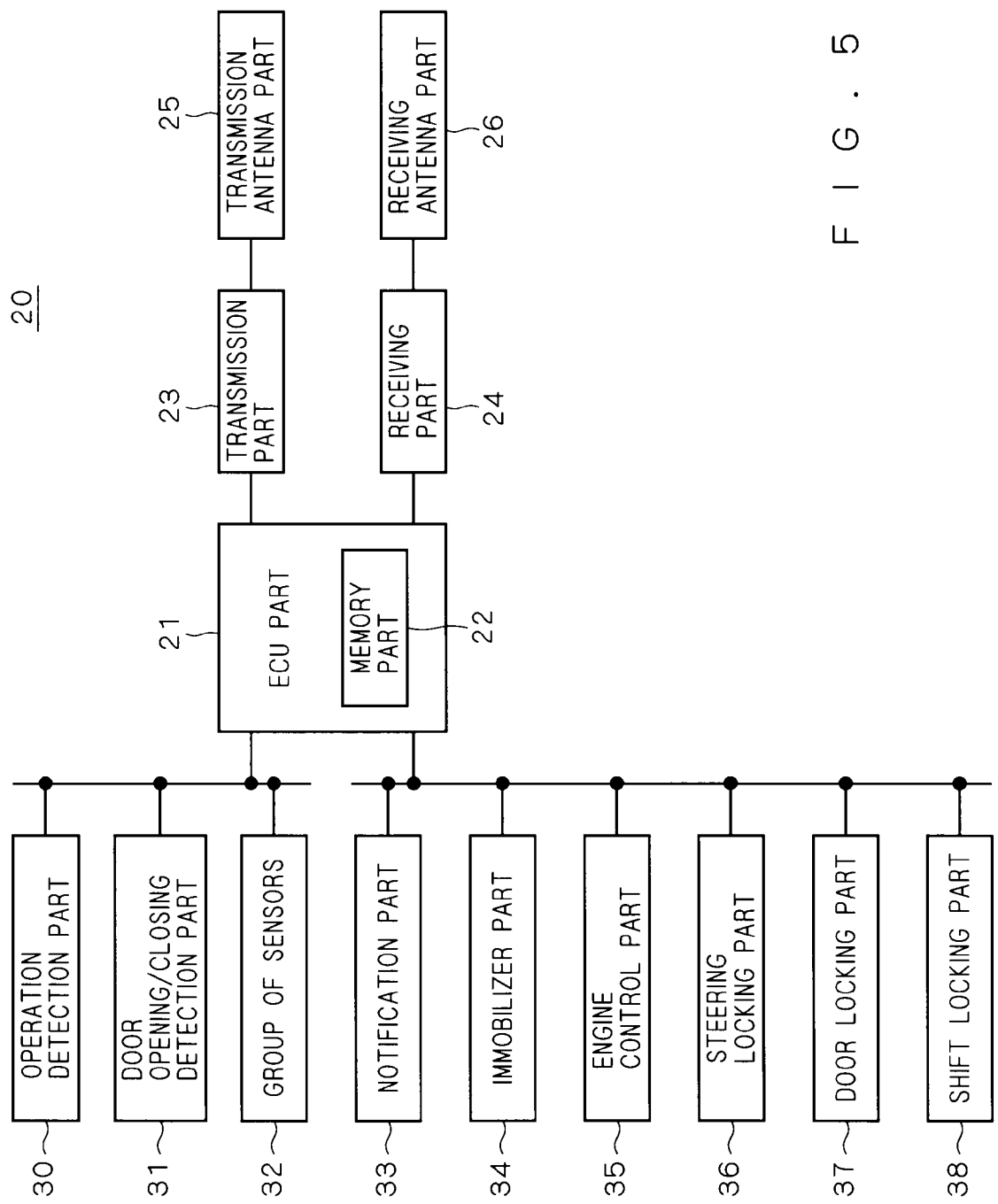
FIG. 5 is a block diagram of an in-car unit according to the first embodiment of the present invention.

Next, FIG. 5 is a block diagram of an in-car unit of the remote control system for a car-mounted device according to the present embodiment. An in-car unit 20 shown in FIG. 5 includes a transmission antenna part 25 and a receiving antenna part 26. The transmission antenna part 25 and the receiving antenna part 26 are formed from a plurality of antennas, and antennas to be used inside and outside a car are mounted to the car. The transmission antenna part 25 is connected to a transmission part 23, and the transmission part 23 is connected to an ECU (electronic control unit) part 21. Likewise, the receiving antenna part 26 is connected to a receiving part 24, and the receiving part 24 is connected to the ECU part 21.

A memory part 22 is built into the ECU part 21. The memory part 22 stores therein ID codes for an inquiry signal and for an immobilizer, encryption keys for the immobilizer and for response code decryption, and the like. The memory part 22 is a non-volatile memory such as an EEPROM, and contents stored therein are retained after power shutdown.

An operation detection part 30 detects various switching operations by a user. As an example, the operation detection part 30 includes a starting switch installed in each outer door handle (signal source for starting the transmission of an inquiry signal), a key knob switch for initiating communication for lock release by pressing an engine switch, the engine switch, etc. The operation detection part 30 detects the positions of the starting switch, the key knob switch, the engine switch (for start-up, for tuning an ignition on, for turning an accessory on and off, and for locking), and supplies the same as an operation detection signal to the ECU part 21.

A door opening/closing detection part 31 detects the opening and closing of each individual one of all doors and locking/unlocking condition of each individual one of all doors, and supplies the same as a door opening/closing detection signal to the ECU part 21. A group of sensors 32 includes various sensors for detecting the speed, the position of transmission, and the operating condition of an engine of a car. Detection signals from these sensors are supplied to the ECU part 21. A notification part 33, an immobilizer part 34, an engine control part 35, a steering locking part 36, a door locking part 37 and a shift locking part 38 are connected to the ECU part 21.

The notification part 33 has an answer back system for turning a light on or sounding a horn in answer back for notifying an operator of door's being locked/unlocked, an alarm system for causing a buzzer to sound to announce various alerts, and a display system for displaying conditions.

The immobilizer part 34 is a mechanism for stopping fuel supply to an engine and ignition operation. The immobilizer part 34 performs immobilization and release using an ID code for an immobilizer and an encryption key that are obtained as a result of verification performed between the ECU part 21 and the portable unit 10 using the transmission part 34 and the receiving part 24.

The engine control part 35 controls the start of an engine using a starter, and controls the actuation and stop of the engine. The steering locking part 36 is a mechanism for locking/unlocking a steering from the position of an engine switch. The door locking part 37 is a mechanism for locking/unlocking all doors. The shift locking part 38 is a locking device for prohibiting the shift from the parking range to another range at a transmission gear shift mechanism, and controls the permission/prohibition of lock release based on a signal from the ECU part 21.

FIG. 6 is a block diagram of the ECU part 21 according to the present embodiment. The ECU part 21 shown in FIG. 6 includes received data analysis means 212 for analyzing data received at the receiving part 24. The received data analysis means 212 receives and analyzes received data 248 from the receiving part 24. When the received data 248 is valid, the received data analysis means 212 transmits a control signal 217 for controlling the notification part 33 and the like according to the type of the received data 248. When the received data analysis means 212 is notified from function judgment means 211 in advance that the smart function is to be used, the received data analysis means 212 notifies the function judgment means 211 that the valid received data 248 has been received.

The function judgment means 211 is caused by an operation detection signal 300 from the operation detection part 30 to notify the receiving part 24 that the keyless function has been changed to the smart function in the form of a function selection signal 215. Likewise, the function judgment means 211 notifies the received data analysis means 212 that the keyless function has been changed to the smart function. Further, the function judgment means 211 instructs transmission data generation means 210 to transmit an inquiry signal 214 for the smart function.

According to the instructions from the function judgment means 211, the transmission data generation means 210 reads an ID code and an encryption key to be used for the inquiry signal 214 for the smart function from the memory part 22, to generate the inquiry signal 214. The transmission data generation means 210 transmits the generated inquiry signal 214 to the transmission part 23, and supplies a signal for specifying a transmission code and a transmission antenna to the transmission part 23. The transmission part 23 modulates the inquiry signal 214, and transmits the same at a certain frequency (such as 125 kHz, for example) to the portable unit 10.

When the receiving part 24 receives a signal at a certain frequency (such as 315 MHz, for example) from the portable unit 10, the received data analysis means 212 analyzes the received data 248, and notifies the function judgment means 211 that the valid received data 248 has been received. Based on the received data 248, the function judgment means 211 judges that the smart function has been changed to the keyless function. The function judgment means 211 notifies a result of judgment in the form of the function selection signal 215 to the receiving part 24. Likewise, the function judgment means 211 notifies the received data analysis means 212 that the smart function has been changed to the keyless function.

Figure 7:
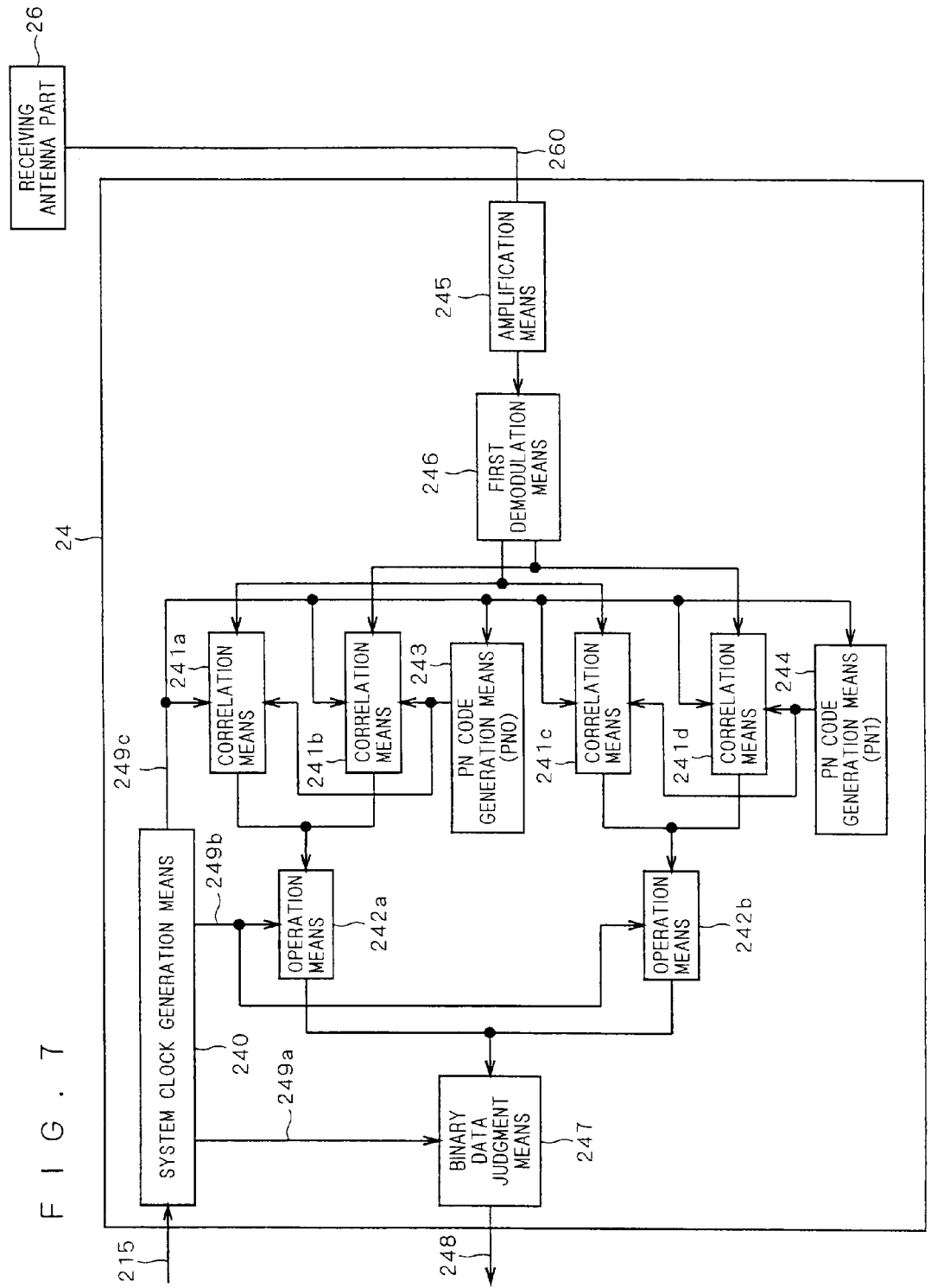
FIG. 7 is a block diagram of a receiving part according to the first embodiment of the present invention.

FIG. 7 is a block diagram of the receiving part 24 according to the present embodiment. The receiving part 24 shown in FIG. 7 includes amplification means 245, first demodulation means 246, correlation means 241*a* to 241*d*, PN code generation means 243 and 244, operation means 242*a* and 242*b*, binary data judgment means 247, and system clock generation means 240. The amplification means 245 amplifies a received signal 260 received from the portable unit 10 through the receiving antenna part 26. The first demodulation means 246 demodulates the amplified received signal 260 in a certain system.

The correlation means 241a to 241d obtain correlations between the demodulated received signal 260, and reference PN codes (PNO, PN 1) generated at the PN code generation means 243 and 244. The operation means 242a and 242b select a signal with a high degree of correlation from the results obtained at the correlation means 241a to 241d. The binary data judgment means 247 compares a correlation value of PNO corresponding to data 0 and a correlation value of PN1 corresponding to data 1 to decide the code of the received signal 260, and transmits the received signal 260 as the received data 248 to the ECU part 21. In the present embodiment, the correlation means 241a to 241d, the operation means 242a and 242b, and the binary data judgment means 247 correspond to identification means for identifying the code of the PN code generation means 151 or 152 selected in the portable unit 10.

Based on the function selection signal 215 notified from the function judgment means 211 in the ECU part 21, the system clock generation means 240 generates system clocks 249a and 249b responsive to either the keyless function or the smart function. The system clock 249a is supplied to the binary data judgment means 247, and the system clock 249b is supplied to the operation means 242a and 242b.

Figure 8:
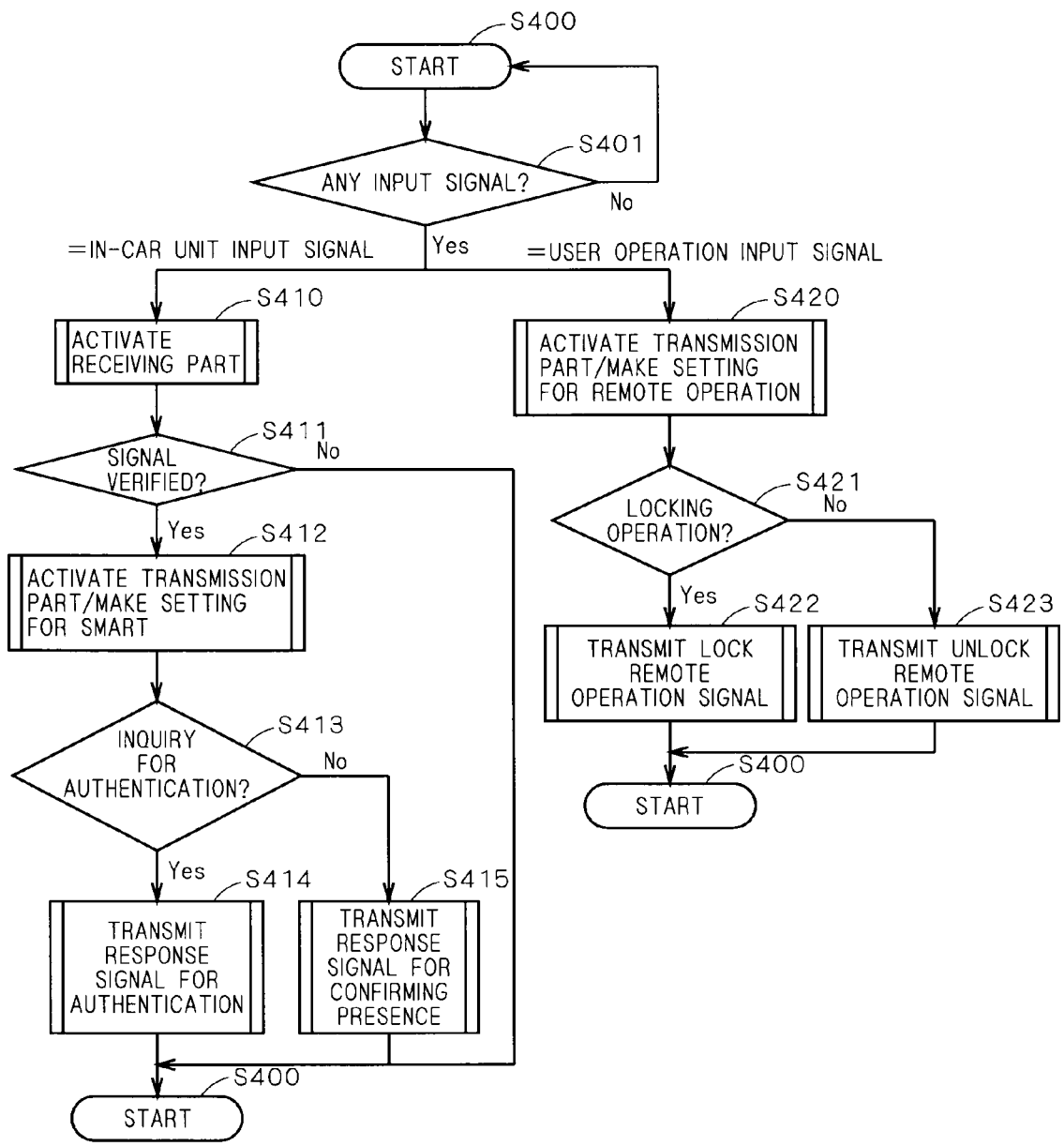
FIG. 8 is a flow chart for explaining process in the portable unit according to the first embodiment of the present invention.

Next, a flow chart of process relating to communication with the in-car unit 20 as part of process executed by the CPU part 12 of the portable unit 10 is shown in FIG. 8. Flow charts of processes executed by the ECU part 21 of the in-car unit 20 are shown in FIGS. 9 to 14. In the below, the operations of the portable unit 10 and the in-car unit 20 are discussed based on these flow charts.

The flow chart shown in FIG. 8 shows a state where the CPU part 12 of the portable unit 10 is in operation. This flow chart starts from step S400, and enters a state of waiting an input signal in step S401. An input signal includes an in-car unit input signal from the in-car unit 20 in the smart function, and a user operation input signal from the operation detection part 11 in the keyless function. Steps S410 and S420 branch off the flow based on these input signals.

In step S410, the receiving part 16 is activated when an in-car unit input signal from the in-car unit 20 is received. In step S411, the in-car unit input signal is verified, and if it is found to be a normal in-car unit input signal, the flow goes to step S412. If the in-car unit input signal is not verified, the flow returns to the start in step S400. In step S412, the transmission part 15 is activated to set a clock and the degree of amplification for the smart function.

In step S413, the type of the in-car unit input signal is decided. If this input signal is an inquiry signal for authentication, the flow goes to step S414. If this input signal is not an inquiry signal for authentication, the flow goes to step S415. In step S414, a response signal for authentication is transmitted to the in-car unit 20, and the flow returns to the start in step S400 to wait for the entry of an input signal. When the input signal is not an inquiry signal for authentication, a response signal for confirming presence is transmitted to the in-car unit 20 in step S415. Then the flow returns to the start in step S400 to wait for the entry of an input signal.

In step S420, when a user operation input signal is received from the operation detection part 11, the transmission part 15 is activated to set a clock and the degree of amplification for the keyless function. Next, in step S421, the type of the user operation input signal is decided. If this input signal is a signal indicating a locking operation, the flow goes to step S422. If this input signal is not a signal indicating a locking operation, it is decided that unlocking operation is indicated and the flow goes to step S423. In step S422, a lock remote operation signal is transmitted to the in-car unit 20, and the flow returns to the start in step S400 to wait for the entry of an input signal. In step S423, an unlock remote operation signal is transmitted to the in-car unit 20, and the flow returns to the start in step S400 to wait for the entry of an input signal.

Figure 9:
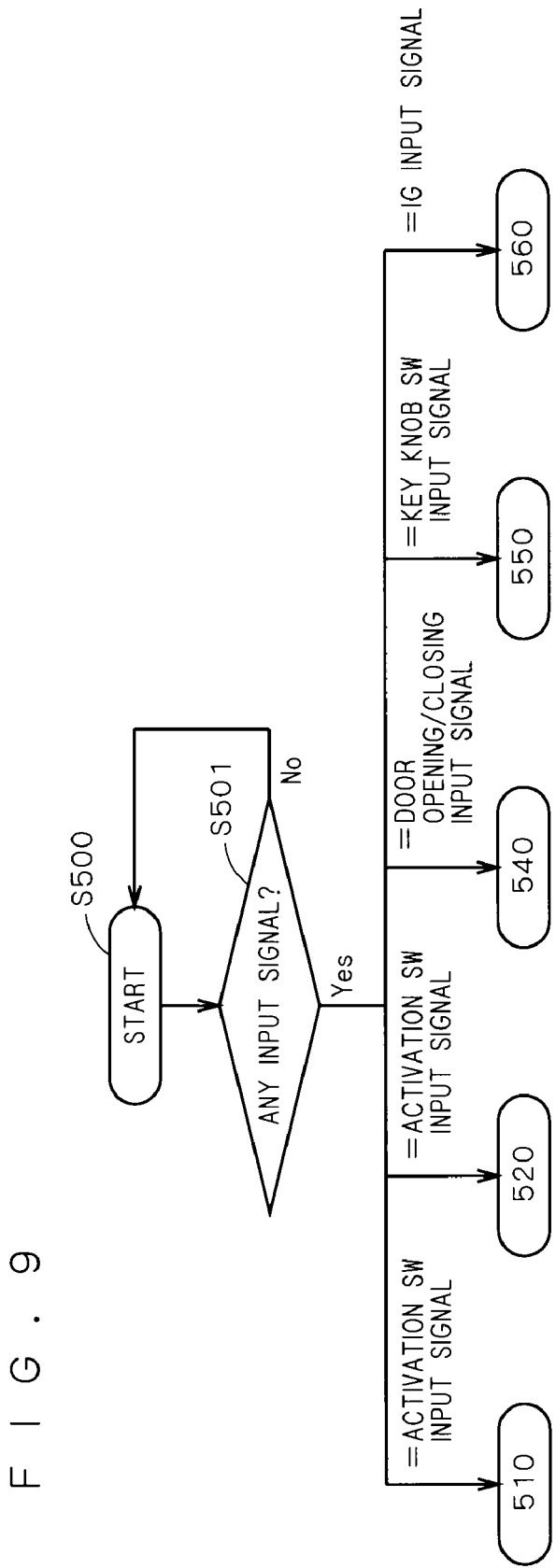
FIG. 9 is a flow chart for explaining process in the in-car unit according to the first embodiment of the present invention.

The flow chart of FIG. 9 shows a state where the ECU part 21 of the in-car unit 20 is in operation. This flow chart starts from step S500, and enters a state of waiting an input signal in step S501. An input signal includes a portable unit input signal from the portable unit 10 in the keyless function, and an activation switch input signal, a door opening/closing input signal, a key knob switch input signal and an ignition input signal in the smart function. These input signals respectively determine subsequent processes to follow. When an input signal is a portable unit input signal, the flow goes to step S510. When an input signal is an activation switch input signal, the flow goes to step S520. When an input signal is a door opening/closing input signal, the flow goes to step S540. When an input signal is a key knob switch input signal, the flow goes to step S550. When an input signal is an ignition input signal, the flow goes to step S560.

Figure 10:
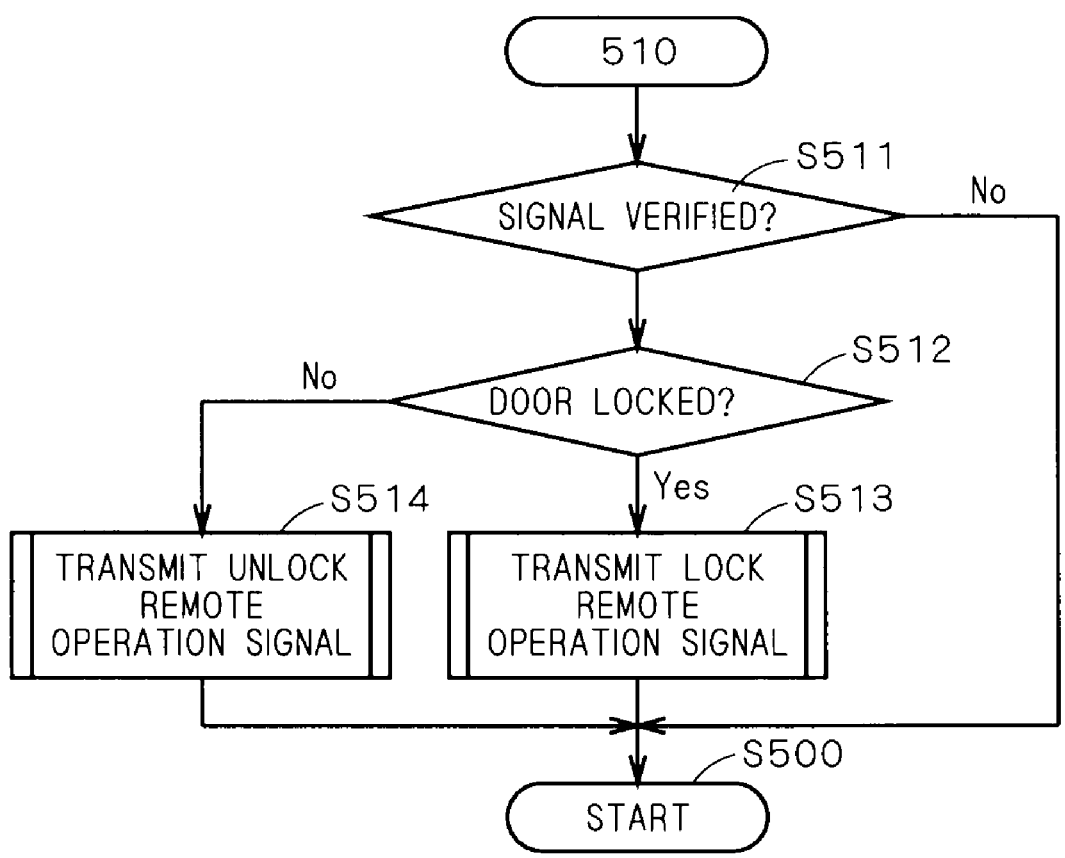
FIG. 10 is a flow chart for explaining process in the in-car unit according to the first embodiment of the present invention.

The flow chart of FIG. 10 shows step S510 and its following process when an input signal is a portable unit input signal. First, in step S511, the portable unit input signal is verified, and if it is found to be a normal portable unit input signal, the flow goes to step S512. If the portable unit input signal is not verified, the flow returns to the start in step S500. In step S512, it is determined whether or not a door is locked. If the door is locked, the flow goes to step S513. If the door is unlocked, the flow goes to step S514. In step S513, an unlocking signal (unlock remote operation signal) is transmitted to the door locking part 37 to unlock the door. Thereafter the flow returns to the start in step S500 to wait for the entry of an input signal. In step S514, a locking signal (lock remote operation signal) is transmitted to the door locking part 37 to lock the door. Thereafter the flow returns to the start in step S500 to wait for the entry of an input signal.

Figure 11:
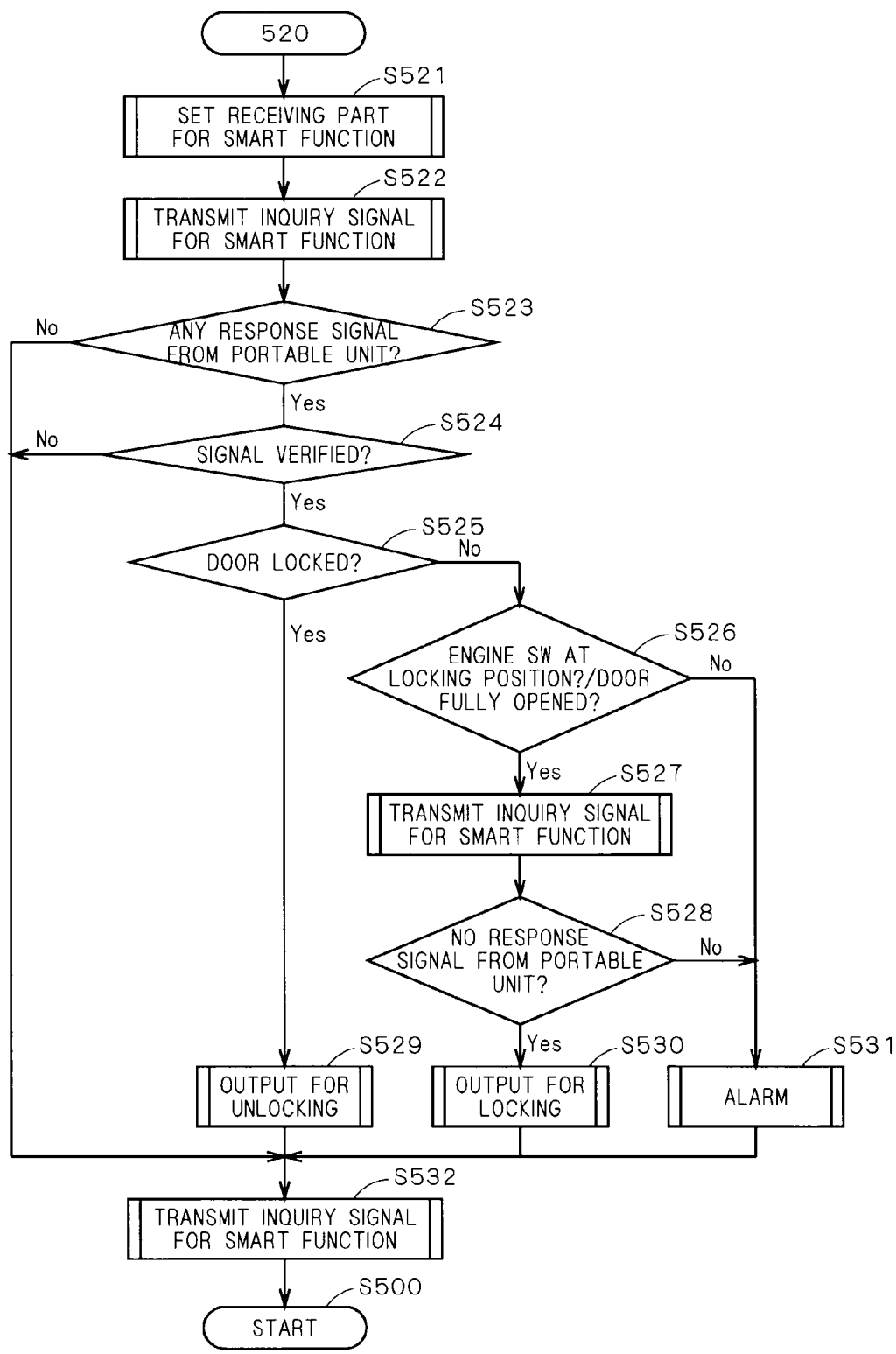
FIG. 11 is a flow chart for explaining process in the in-car unit according to the first embodiment of the present invention.

Next, the flow chart of FIG. 11 shows step S520 and its following process when an input signal is an activation switch input signal (activation SW input signal) (when the activation SW is ON). In step S521, the receiving part 24 is set to be applied for the smart function. In step S522, an inquiry signal is transmitted to the portable unit 10. In step S523, a response signal from the portable unit 10 is expected. If the response signal is received, the flow goes to step S524. If the response signal is not received, the flow goes to step S532. In step S524, the response signal is verified, and if it is found to be a normal response signal, the flow goes to step S525. If the response signal is not verified, the flow goes to step S532.

In step S525, the state of door's being locked by the door locking part 37 is examined. If the door is locked, the flow goes to step S529. If the door is unlocked, the flow goes to step S526. In step S529, an unlocking signal is transmitted to the door locking part 37, and the flow goes to step S532. In step S526, the engine control part 35 examines the conditions of an engine switch (engine SW), a locking position, door's fully opened, etc. If all of these are stopped, the flow goes to step S527. If all of these are not stopped, the flow goes to step S531. In step S527, an inquiry signal is transmitted to check whether the portable unit 10 is not in the car. In step S528, the presence or absence of a response signal in response to the inquiry signal transmitted in step S527 is determined. If there is no response signal, the flow goes to step S530. If there is a response signal, the flow goes to step S531.

In step S530, it is determined that the portable unit 10 is not in the car, so a locking signal is transmitted to the door locking part 37. Thereafter the flow goes to step S532. An alarm is issued in step S531 if the stopped condition is not recognized in step S526, or if it is determined that the portable unit 10 is in the car in step S528. Then, the flow goes to step S532. In step S532, the receiving part 24 is set to be applied for the keyless function, and the flow returns to the start in step S500. If a response signal is not recognized in step S523, or if verification is not made in step S524, the receiving part 24 is also set to be applied for the keyless function in step S532. Thereafter the flow returns to the start in step S500.

Figure 12:
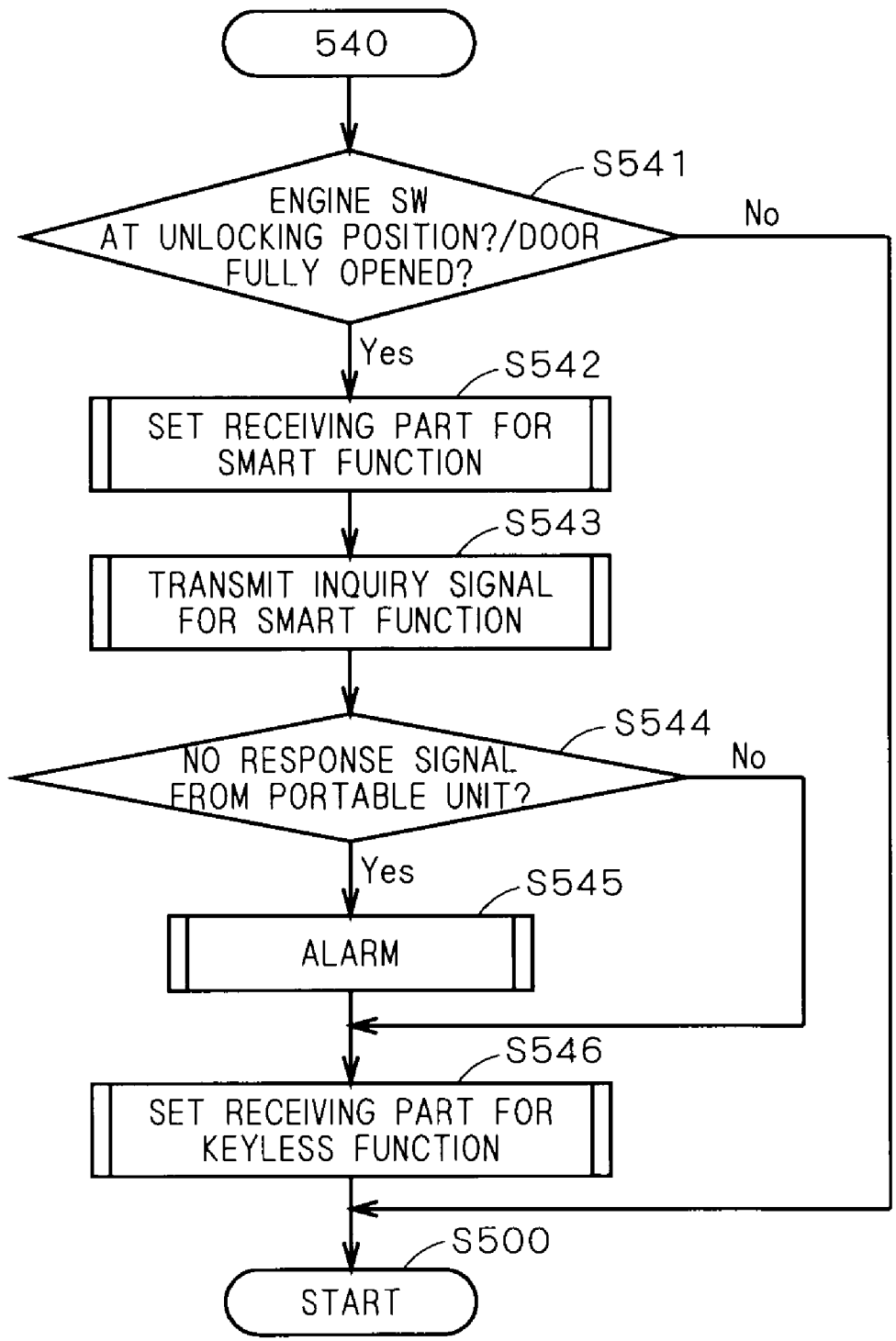
FIG. 12 is a flow chart for explaining process in the in-car unit according to the first embodiment of the present invention.

Next, the flow chart of FIG. 12 shows step S540 and its following process when an input signal is a door opening/closing input signal. In step S541, it is determined whether or not the engine SW is at an unlocking position. If the engine SW is at an unlocking position, the flow goes to step S542. If the engine SW is not at an unlocking position, the flow returns to the start in step S500. In step S542, the receiving part 24 is set to be applied for the smart function. In step S543, an inquiry signal is transmitted to check whether or not the portable unit 10 is in the car. In step S544, the presence or absence of a response signal in response to the inquiry signal transmitted in step S543 is determined. If there is no response signal, the flow goes to step S545. If there is a response signal, the flow goes to step S546.

It is found that the portable unit 10 is not in the car by the absence of a response signal, so an alarm is issued as the positional abnormality of the engine SW in step S545. In step S546, the receiving part 24 is set to be applied for the keyless function, and thereafter the flow returns to the start in step S500. It is found in step S544 that the portable unit 10 is in the car by the presence of a response signal. So the process in step S546 is performed without the issue of an alarm in step S545, and the flow returns to the start in step S500.

Figure 13:
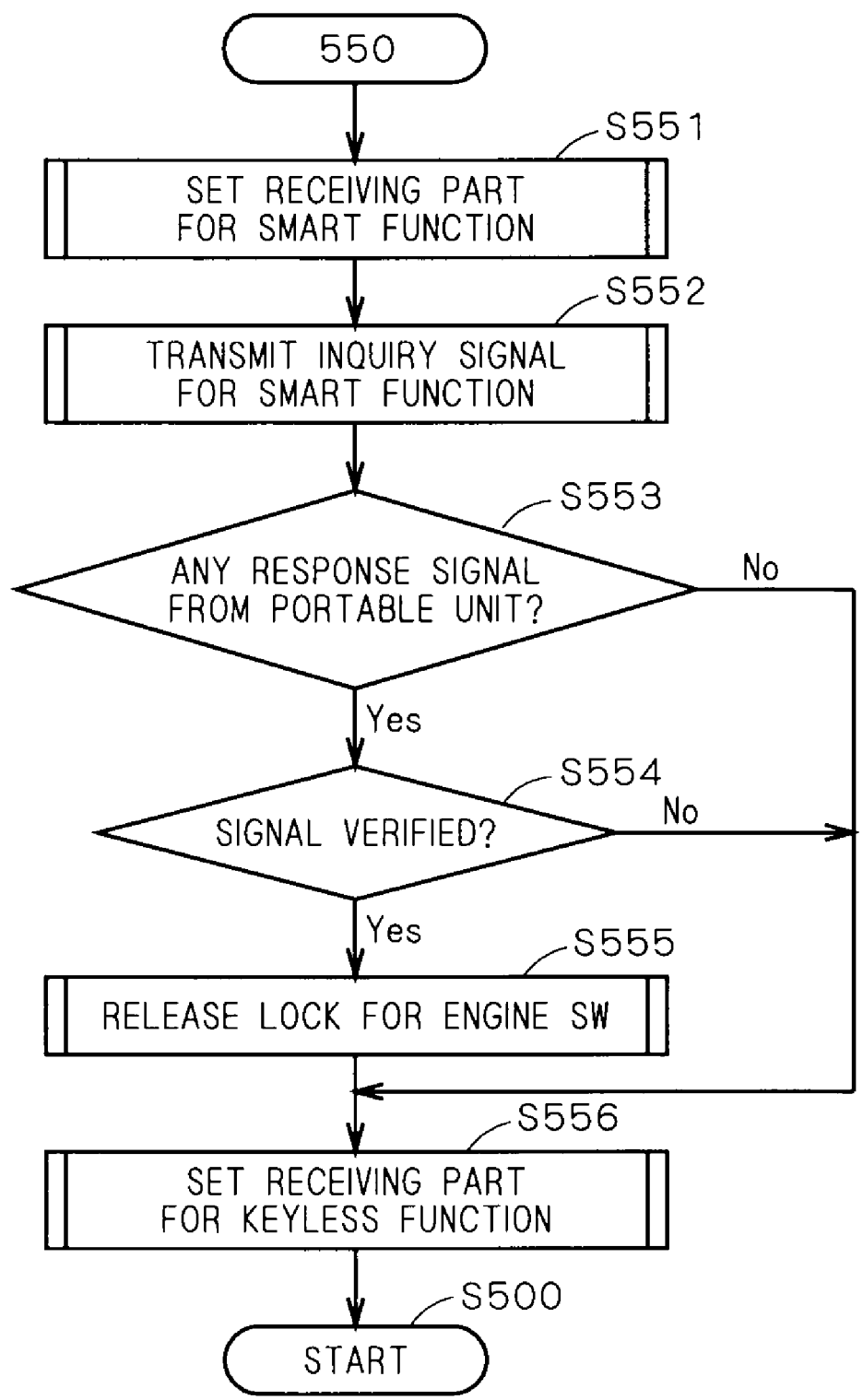
FIG. 13 is a flow chart for explaining process in the in-car unit according to the first embodiment of the present invention.

Next, the flow chart of FIG. 13 shows step S550 and its following process when an input signal is a key knob switch input signal (when the key knob SW is ON). In step S551, the receiving part 24 is set to be applied for the smart function. In step S552, an inquiry signal is transmitted to check whether or not the portable unit 10 is in the car. In step S553, the presence or absence of a response signal in response to the inquiry signal transmitted in step S552 is determined. If there is a response signal, the flow goes to step S554. If there is no response signal, the flow goes to step S556.

In step S554, the response signal is verified, and if it is found to be a normal response signal, the flow goes to step S555. If the response signal is not verified, the flow goes to step S556. In step S555, a lock releasing signal for the engine SW is output to the car. In step S556, the receiving part 24 is set to be applied for the keyless function, and thereafter the flow returns to the start in step S500. If there is no response signal in step S553, or if the response signal is not verified in step S554, the process in step S556 is performed, and then the flow returns to the start in step S500.

Figure 14:
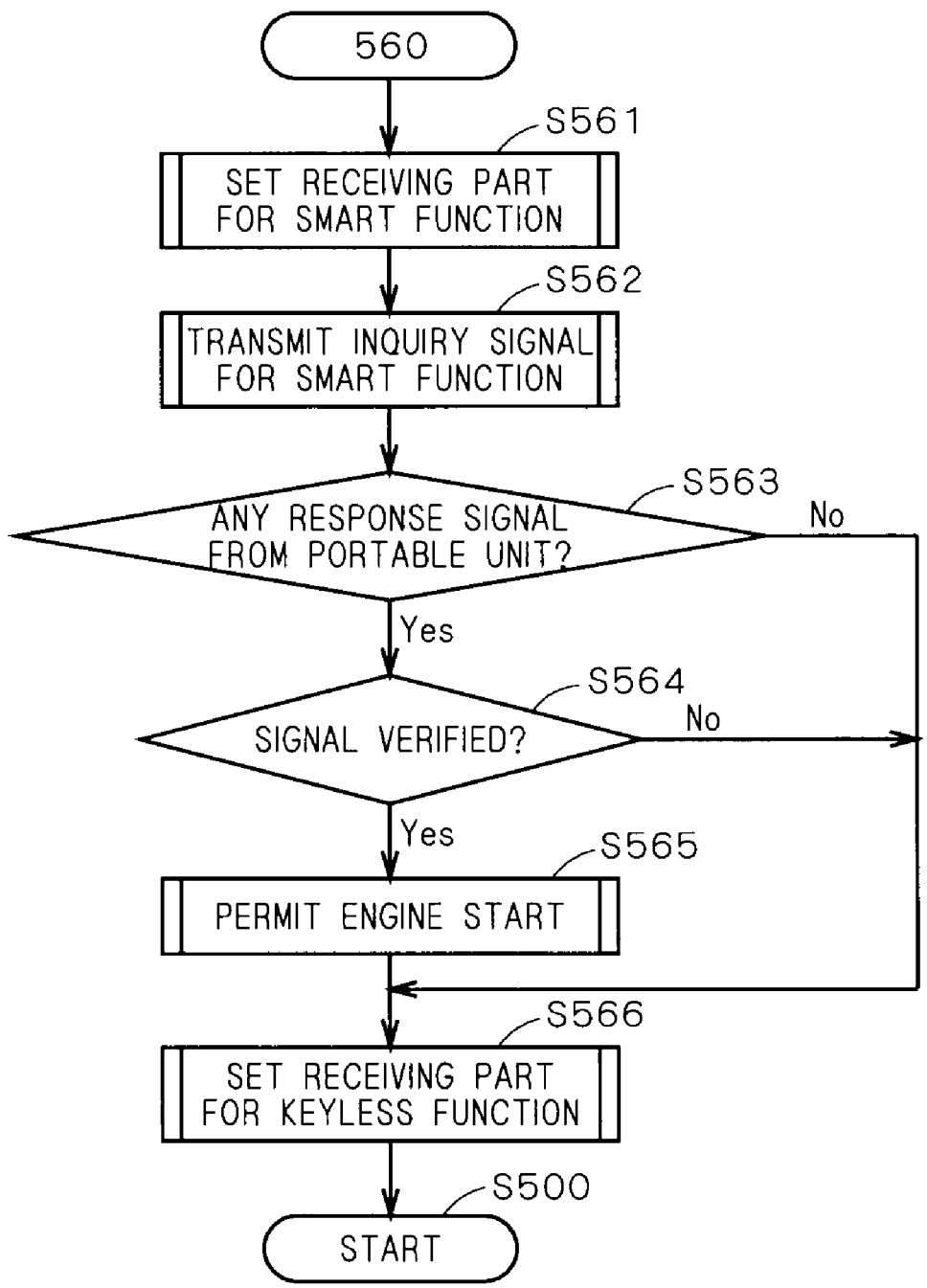
FIG. 14 is a flow chart for explaining process in the in-car unit according to the first embodiment of the present invention.

Next, the flow chart of FIG. 14 shows step S560 and its following process when an input signal is an ignition input signal (IG input signal) (when an IG switch is ON). In step S561, the receiving part 24 is set to be applied for the smart function. In step S562, an inquiry signal is transmitted to check whether or not the portable unit 10 is in the car. In step S563, the presence or absence of a response signal in response to the inquiry signal transmitted in step S562 is determined. If there is a response signal, the flow goes to step S564. If there is no response signal, the flow goes to step S566.

In step S564, the response signal is verified, and if it is found to be a normal response signal, the flow goes to step S565. If the response signal is not verified, the flow goes to step S566. In step S565, a signal for permitting engine start is output to the car. In step S566, the receiving part 24 is set to be applied for the keyless function, and thereafter the flow returns to the start in step S500. If there is no response signal in step S563, or if the response signal is not verified in step S564, the process in step S566 is performed, and then the flow returns to the start in step S500.

As discussed, in the remote control system for a car-mounted device according to the present embodiment, the function judgment means 121 and 211 mounted in the CPU part 12 of the portable unit 10 and the ECU part 21 of the in-car unit 20 respectively judge whether the keyless function or the smart function is used, and a system clock generated at the system clock generation part 150 of the transmission part 15 of the portable unit 10 is changed according to each function. Thus, in the remote control system for a car-mounted device of the present embodiment, a transmission band is changed in response to each function, and transmission power is changed in response to each function (to a level corresponding for example to that of an extremely low power radio station or higher) at the amplification means 155. In the in-car unit 20 of the present embodiment, a system clock generated at the system clock generation means 240 of the receiving part 24 is changed in response to each function, so that a transmission signal in response to each function is received from the portable unit 10.

Figure 15:
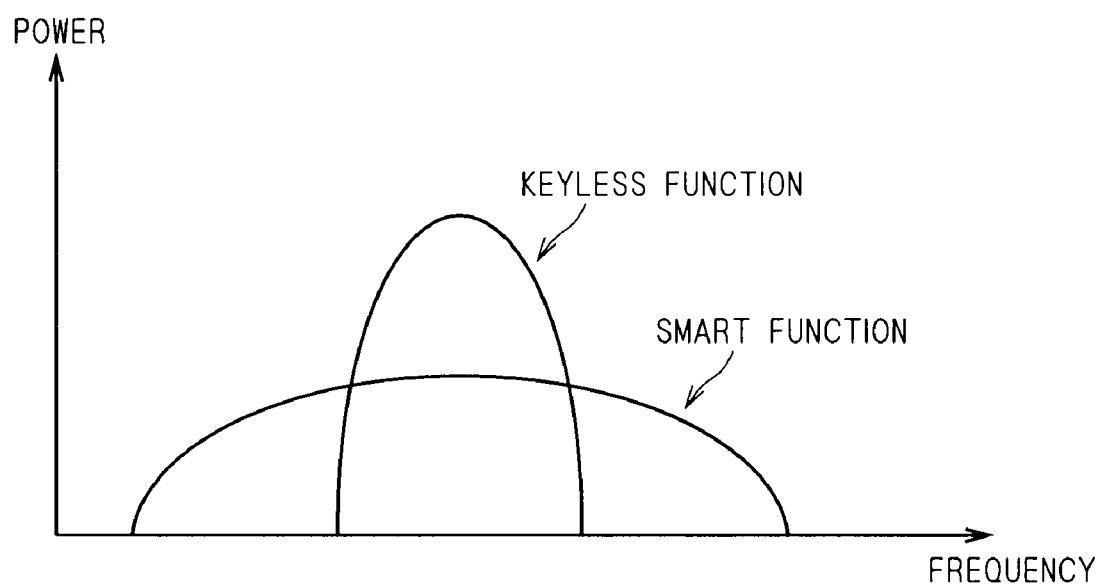
FIG. 15 is a view for explaining power-frequency relation in the remote control system for a car-mounted device according to the first embodiment of the present invention.

In the remote control system for a car-mounted device of the present embodiment, the function judgment means 121 and 211 judges whether the keyless function or the smart function is used, and a system clock in response to each function is changed, thereby changing the transmission band of a transmission signal and changing transmission power. As a result, a transmission signal with power-frequency characteristic shown in FIG. 15 is obtained. As shown in FIG. 15, in the remote-control system for a car-mounted device of the present embodiment, high transmission power (corresponding for example to that of a specified low power radio station) and a narrow band (a bandwidth of 1 MHz, for example) are suitable for the keyless function, compared to those for the smart function. Low transmission power (corresponding for example to that of an extremely low power radio station) and a wide band are suitable for the smart function, compared to those for the keyless function. Then, in response to each function, a system clock is set low for the keyless function and high for the smart function, while transmission power is set high for the keyless function and low for the smart function. Thus, it is possible to switch between a high-power narrow-band signal (corresponding for example to that of a specified low power radio station) required in the keyless function and a low-power wide-band signal (corresponding for example to that of an extremely low power radio station) required in the smart function.

(Second Embodiment)

Figure 16:
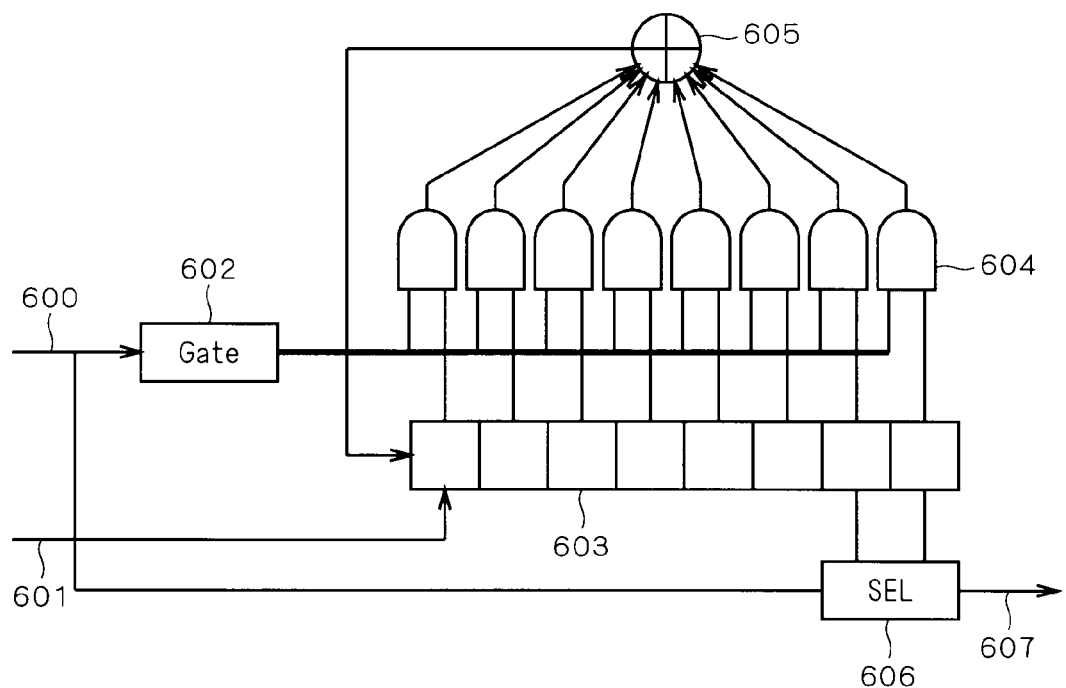
FIG. 16 is a schematic view of PN code generation means according to a second embodiment of the present invention.

FIG. 16 is a schematic view of PN code generation means according to the present embodiment. The PN code generation means shown in FIG. 16 is capable of changing a code length and a chip rate, and an M-sequence generator capable of changing a code length and a chip rate using codes of M-sequence as spreading codes is adopted as an example. An input signal 600 is a signal to be changed in code length, and based on the input signal 600, a signal to be fed back is selected using gate signal generation means 602 and feedback signal gates 604. The PN code generation means shown in FIG. 16 is also capable of changing the code length of a PN code to be output by selecting the number of output stages at a selector 606.

The PN code generation means shown in FIG. 16 includes a shift resistor 603 and operation means 605 for obtaining an exclusive OR with a feedback signal. A clock signal 601 is a system clock generated at system clock generation means. The clock signal 601 is capable of changing the operating frequency of the shift register 603, and is capable of changing the chip rate of a PN code.

As discussed, in the PN code generation means of the present embodiment, codes with different code lengths and chip rates are generated. So, signals different in transmission band and signal separation performance between the keyless function and the smart function are generated without increasing circuit scale.

(Third Embodiment)

Figure 17:
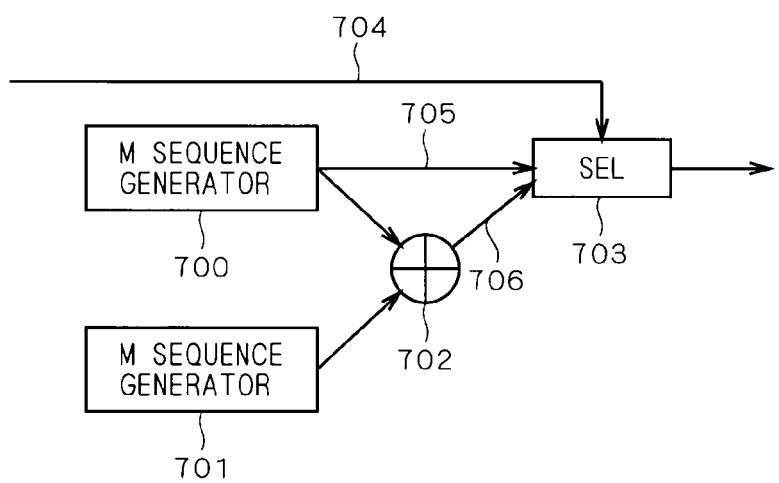
FIG. 17 is a schematic view of PN code generation means according to a third embodiment of the present invention.

FIG. 17 is a schematic view of PN code generation means according to the present embodiment. The PN code generation means shown in FIG. 17 is capable of changing a code type, and a structure for making a change between Gold sequence with large number of codes and M sequence showing excellence in signal separation performance is shown as an example. The PN code generation means shown in FIG. 17 includes M sequence generators 700 and 701, the detailed structure of which is the same as that shown in FIG. 16. Codes generated at the M sequence generators 700 and 701 are input to an exclusive OR 702, and an output therefrom is a code 706 of Gold sequence.

The PN code generation means shown in FIG. 17 includes a selector 703 for selecting a code 705 of M sequence generated at the M sequence generator 700, or the code 706 of Gold sequence output from the exclusive OR 702 based on a selection signal 704. Thus, the PN code generation means shown in FIG. 17 is capable of freely switching between the code 705 of M sequence and the code 706 of Gold sequence.

As discussed, in the PN code generation means of the present embodiment, it is possible to switch between M sequence showing excellence in signal separation performance with a high degree of autocorrelation and a low degree of cross-correlation, and Gold sequence with large number of codes and which shows excellence in interference performance. As a result, a spreading code type is easily changed between the keyless function and the smart function, and interference performance and signal separation performance are compatible with each other.

(Fourth Embodiment)

Figure 18:
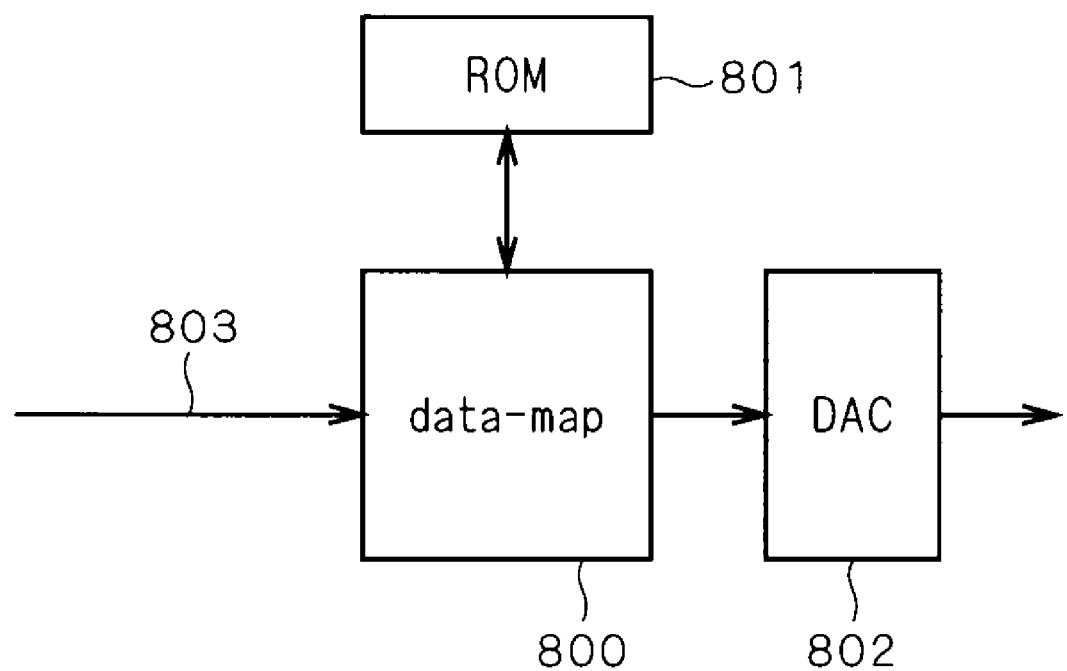
FIG. 18 is a schematic view of first modulation means according to a fourth embodiment of the present invention.

FIG. 18 is a schematic view of first modulation means of the present embodiment. In the first modulation means shown in FIG. 18, a structure for controlling a transmission band by changing first modulation system is shown. More specifically, in the first modulation means shown in FIG. 18, a structure for making a change between BPSK modulation system and GMSK modulation system as the first modulation system is shown.

The first modulation means shown in FIG. 18 includes a data-map 800 for performing modulation, a ROM 801 in which an analog sampling waveform is stored, and a DAC 802 for converting a digital waveform into an analog waveform. The data-map 800 reads ROM data corresponding to BPSK modulation or GMSK modulation from the ROM 801 in response to an input signal 803, and modulates the input signal 803 based on this ROM data. The input signal 803 thereby modulated is converted into an analog waveform at the DAC 802, and is then transmitted to the amplification means 155.

As discussed, in the first modulation means of the present embodiment, it is possible to switch between GMSK modulation system capable of narrowing the band of a transmission signal while suffering from the degeneration of communication quality, and BPSK modulation system showing excellence in communication quality while being incapable of narrowing a transmission band. Thus, for the keyless function requiring band narrowing, GMSK modulation system is employed to realize band narrowing without changing transmission speed or code length.

While the invention has been shown and described in detail, the foregoing description is in all aspects illustrative and not restrictive. It is therefore understood that numerous modifications and variations can be devised without departing from the scope of the invention.

The invention claimed is:

1. A remote control system for a car-mounted device, comprising:
    a portable unit; and
    an in-car unit for controlling an operation in a car by communication with said portable unit;
    said portable unit including:
        a transmission part to transmit a signal intended for a smart function and a signal intended for a keyless function, the keyless function signal being transmitted in response to operating an operating part on the portable unit and the smart function signal being transmitted without operating the operating part;
        function judgment means for judging whether the keyless function is used based on use of the operating part and whether the smart function is used based on an inquiry signal from said in-car unit;
        amplification means for controlling transmission power of the transmission part in response to a result of judgment obtained at said function judgment means; and
        system clock generation means for controlling a transmission band of the transmission part in response to a result of judgment obtained at said function judgment part;
    said in-car unit including:
        in-car function judgment means for judging whether the keyless function or the smart function is used based on a response signal from said portable unit; and
        in-car system clock generation means for controlling a receiving band of an in-car receiving part in response to a result of judgment obtained at said in-car function judgment means.

2. The remote control system for a car-mounted device according to claim 1, wherein
    said amplification means of said portable unit controls transmission power of the transmission part to be amplified to a level not higher than certain power, or to a level not lower than the certain power in response to a result of judgment obtained at said function judgment means.

3. The remote control system for a car-mounted device according to claim 1, wherein
    said portable unit further includes PN code generation means capable of changing a spreading code length and a chip rate to control a transmission band, and
    said in-car unit further includes in-car PN code generation means capable of changing a spreading code length and a chip rate to control a receiving band.

4. The remote control system for a car-mounted device according to claim 2, wherein
said portable unit further includes PN code generation means capable of changing a spreading code length and a chip rate to control a transmission band, and
said in-car unit further includes in-car PN code generation means capable of changing a spreading code length and a chip rate to control a receiving band.

5. The remote control system for a car-mounted device according to claim 3, wherein
said PN code generation means of said portable unit includes a plurality of PN code generation means, and said portable unit further includes PN code switching means for selecting one of said plurality of PN code generation means, and
said in-car unit further includes identification means for identifying a code of said PN code generation means selected at said portable unit.

6. The remote control system for a car-mounted device according to claim 4, wherein
said PN code generation means of said portable unit includes a plurality of PN code generation means, and said portable unit further includes PN code switching means for selecting one of said plurality of PN code generation means, and
said in-car unit further includes identification means for identifying a code of said PN code generation means selected at said portable unit.

7. The remote control system for a car-mounted device according to claim 3, wherein
said portable unit further includes first modulation means capable of changing first modulation system of a transmission signal, and
said in-car unit further includes first demodulation means capable of demodulating a transmission signal modulated by said first modulation means.

8. The remote control system for a car-mounted device according to claim 2, wherein
said portable unit further includes first modulation means capable of changing first modulation system of a transmission signal, and
said in-car unit further includes first demodulation means capable of demodulating a transmission signal modulated by said first modulation means.

9. The remote control system for a car-mounted device according to claim 3, wherein
said portable unit controls a transmission band of a response signal in response to power of an inquiry signal transmitted from said in-car unit in the smart function.

10. The remote control system for a car-mounted device according to claim 2, wherein
said portable unit controls a transmission band of a response signal in response to power of an inquiry signal transmitted from said in-car unit in the smart function.

* * * * *